(12) United States Patent
Exner et al.

(10) Patent No.: US 10,562,684 B2
(45) Date of Patent: Feb. 18, 2020

(54) METHOD AND APPARATUS PERTAINING TO A FLEXIBLE WRAPPING MATERIAL HAVING LASER-FORMED CREASE LINES

(71) Applicant: Kraft Foods Schweiz Holding GmbH, Zug (CH)

(72) Inventors: Ronald H. Exner, Munich (DE); Paul Veternik, Munich (DE); Monique Evans, Munich (DE); Stefan Scheuch, Munich (DE)

(73) Assignee: Kraft Foods Schweiz Holding GmbH, Zug (CH)

( * ) Notice: Subject to any disclaimer, the term of this patent is extended or adjusted under 35 U.S.C. 154(b) by 815 days.

(21) Appl. No.: 14/981,288

(22) Filed: Dec. 28, 2015

(65) Prior Publication Data
US 2016/0107812 A1    Apr. 21, 2016

Related U.S. Application Data

(63) Continuation of application No. 13/032,921, filed on Feb. 23, 2011, now abandoned.

(51) Int. Cl.
| | |
|---|---|
| *B31B 50/00* | (2017.01) |
| *B65D 65/12* | (2006.01) |
| *B65D 75/16* | (2006.01) |
| *B65D 75/12* | (2006.01) |

(Continued)

(52) U.S. Cl.
CPC ............ *B65D 65/12* (2013.01); *B23K 26/364* (2015.10); *B31B 70/25* (2017.08); *B65B 11/004* (2013.01);
(Continued)

(58) Field of Classification Search
CPC ....... B31B 50/25; B31B 50/002; B31B 50/14; B65D 65/02; B65D 65/12; B65D 75/04; B23K 26/362
(Continued)

(56) References Cited

U.S. PATENT DOCUMENTS

| | | |
|---|---|---|
| 3,909,582 A | 9/1975 | Bowen |
| 4,124,965 A | 11/1978 | Stahl |

(Continued)

FOREIGN PATENT DOCUMENTS

| | | |
|---|---|---|
| EP | 0357841 | 3/1990 |
| FR | 2576836 | 8/1986 |

(Continued)

OTHER PUBLICATIONS

European Search Report dated Sep. 9, 2010; European Patent Application No. 10001825.8-2308.

*Primary Examiner* — Gloria R Weeks
(74) *Attorney, Agent, or Firm* — Fitch, Even, Tabin & Flannery, LLP

(57) ABSTRACT

One or more lasers (80, 100) form one or more crease lines (140, 150, 151) in a flexible wrapping material (60). The flexible wrapping material is then folded about the one or more crease lines when encapsulating an item to be wrapped within the flexible wrapping material. The flexible wrapping material may have poor dead-fold characteristics and can comprise a flow-wrapping material. A single laser or multiple lasers can serve to form the one or more crease lines. The crease lines can be formed on a same side of the flexible wrapping material or on both sides thereof. By one approach, folding the flexible wrapping material about the one or more crease lines forms, at least in part, a form-factor conformal pocket to accommodate the aforementioned item. By another approach, folding the flexible wrapping material about the one or more crease lines forms, at least in part, a gusset.

11 Claims, 11 Drawing Sheets

(51) Int. Cl.
*B65D 75/58* (2006.01)
*B23K 26/364* (2014.01)
*B65B 61/02* (2006.01)
*B65B 43/10* (2006.01)
*B65B 11/00* (2006.01)
*B31B 70/00* (2017.01)
*B65D 65/04* (2006.01)
*B65D 85/60* (2006.01)
*B65D 75/50* (2006.01)

(52) U.S. Cl.
CPC ............. *B65B 43/10* (2013.01); *B65B 61/02* (2013.01); *B65D 75/12* (2013.01); *B65D 75/16* (2013.01); *B65D 75/58* (2013.01); *B65D 65/04* (2013.01); *B65D 75/50* (2013.01); *B65D 85/60* (2013.01)

(58) Field of Classification Search
USPC .............................. 53/412, 461; 493/59, 396
See application file for complete search history.

(56) References Cited

U.S. PATENT DOCUMENTS

| | | |
|---|---|---|
| 5,229,180 A | 7/1993 | Littmann |
| 5,630,308 A | 5/1997 | Guckenberger |
| 6,863,212 B2 | 3/2005 | Stone |
| 7,331,159 B2* | 2/2008 | Osgood .................. B65B 11/12 53/412 |
| 8,276,350 B2 | 10/2012 | Bouzas |
| 8,959,877 B2* | 2/2015 | Maki ..................... B65D 5/542 229/121 |
| 10,124,554 B2* | 11/2018 | Persson .................... B31F 1/10 |
| 2006/0201115 A1 | 9/2006 | VanGordon |
| 2011/0203229 A1* | 8/2011 | Exner .................... B65B 11/54 53/462 |
| 2012/0325711 A1* | 12/2012 | Markovic ................ B65D 5/04 206/459.5 |
| 2016/0001946 A1* | 1/2016 | Tijssen .................. B65D 85/34 426/106 |
| 2016/0107812 A1* | 4/2016 | Exner .................... B65D 65/12 229/87.01 |
| 2016/0152388 A1* | 6/2016 | Bartkow ................ B65D 65/02 220/796 |
| 2017/0283146 A1* | 10/2017 | Polikeit ............. B65D 75/5844 |

FOREIGN PATENT DOCUMENTS

| | | |
|---|---|---|
| WO | 9737837 | 10/1997 |
| WO | 9929496 | 6/1999 |

* cited by examiner

METHOD AND APPARATUS PERTAINING TO A FLEXIBLE WRAPPING MATERIAL HAVING LASER-FORMED CREASE LINES

RELATED APPLICATION(S)

This application is a continuation of U.S. patent application Ser. No. 13/032,921, entitled METHOD AND APPARATUS PERTAINING TO A FLEXIBLE WRAPPING MATERIAL HAVING LASER-FORMED CREASE LINES and filed Feb. 23, 2011, which is incorporated by reference in its entirety herein.

TECHNICAL FIELD

These teachings relate generally to flexible wrapping materials and more particularly to the use of lasers with respect to such flexible wrapping materials.

BACKGROUND

Flexible wrapping materials of various kinds are known in the art. These include paper-based, foil-based, and plastics-based materials of various kinds. Some materials are better than others to suit the needs and/or limitations of a particular application setting. For example, materials having good dead-fold characteristics (such as many paper-based and foil-based materials and some plastics-based materials) are well suited to application settings where a final package will benefit from well-defined lines and contours. Many plastics-based materials, on the other hand, are particularly well suited to cost-effective, high-speed packaging environments where the manufacturer seeks a hermetic or nearly-hermetic seal.

Unfortunately, few (if any) materials are well suited to all application settings. For example, the benefits of plastics-based materials, such as flow-wrapping materials, are hard to achieve when also seeking to provide a final package having well-defined lines and contours (and particularly in the absence of an internal frame, tray, or the like). This may be because typical flow-wrapping materials exhibit little in the way of dead-fold characteristics. As a result, the manufacturer must often be satisfied with using inner paperboard trays or boxes and then wrapping the plastics-based material tightly and conformally about the tray/box in order to achieve the desired well-defined lines and contours of the final package.

In the absence of a solution to this technical problem, manufacturers must typically choose either between cost-effective packaging that fails to offer a desired form factor or less cost-effective packaging when demanding a well-defined form factor.

BRIEF DESCRIPTION OF THE DRAWINGS

The above needs are at least partially met through provision of the method and apparatus pertaining to a flexible wrapping material having laser-formed crease lines described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein

DESCRIPTION OF THE DRAWINGS

Generally speaking, one or more lasers form one or more crease lines in a flexible wrapping material. The flexible wrapping material is then folded about the one or more crease lines when encapsulating an item to be wrapped within the flexible wrapping material.

The use of a laser to create fold lines provides a number of important advantages. Firstly, it allows the folding of materials which were previously difficult to fold. Secondly, it provides greater flexibility in the nature of the fold lines which can be achieved, thereby allowing more complex shapes to be easily formed. Thirdly, it allows for the adjustment of fold lines without complex re-tooling.

By one approach the flexible wrapping material comprises a flow-wrapping material (including both single ply materials as well as multi-ply materials such as various laminates). By another approach, the flexible wrapping material may have poor dead-fold characteristics.

These teachings will readily accommodate using a single laser to form the one or more crease lines as well as employing multiple lasers for this purpose. The crease lines can be formed on a same side of the flexible wrapping material or on both sides thereof.

By one approach, folding the flexible wrapping material about the one or more crease lines forms, at least in part, a form-factor conformal pocket to accommodate the aforementioned item. That is, a pocket having a form-factor that receives and essentially reflects the form factor of the item itself. By another approach, folding the flexible wrapping material about the one or more crease lines forms, at least in part, a gusset.

So configured, a package comprised of a flexible wrapping material can nevertheless yield a final package having well-defined lines and contours. This can be particularly useful when employed with items that have a form factor other than that of a rectangular parallelepiped. By faithfully reflecting at least certain peripheral shapes of such an item, the resultant package attains a uniqueness and aesthetic quality that can otherwise only typically be achieved by using considerably more expensive and/or undesired materials or processes.

By one approach, at least one of the fold lines is curved. This allows for the production of novel and interesting curved packaging. For example, there may be a pair of opposed curved fold lines curving in opposite senses to define therebetween a primary surface of the wrap.

By one approach, at least one fold line extends into a cut line for opening the wrapping. This provides a simple way of allowing a consumer access to the wrapped item. The opening mechanism is satisfying for the consumer as the tear line readily blends into the fold line which then doubles itself as a tear line.

These teachings have a particular application in a flow wrap packaging method. In such a case, for example, the wrapping is carried out with a single web of flexible wrapping material and further comprises the step of cutting the web into individual packages after the item has been encapsulated. By one approach, also, the flexible wrapping material is creased and folded in a continuous process.

The method is applicable to flexible wrapping material in general, but has particular application to wrapping material having a plastics content of at least 50%, preferably at least 70% by volume. The bulk of the remaining material may be aluminum as is well-known in the art.

Furthermore, these teachings are readily employed in a modern packaging line where lasers are already often employed to cut the wrapping material. These teachings will also readily accommodate high-speed packaging line requirements. Accordingly, these teachings are readily deployable in an economically-favorable manner.

Figure 1:
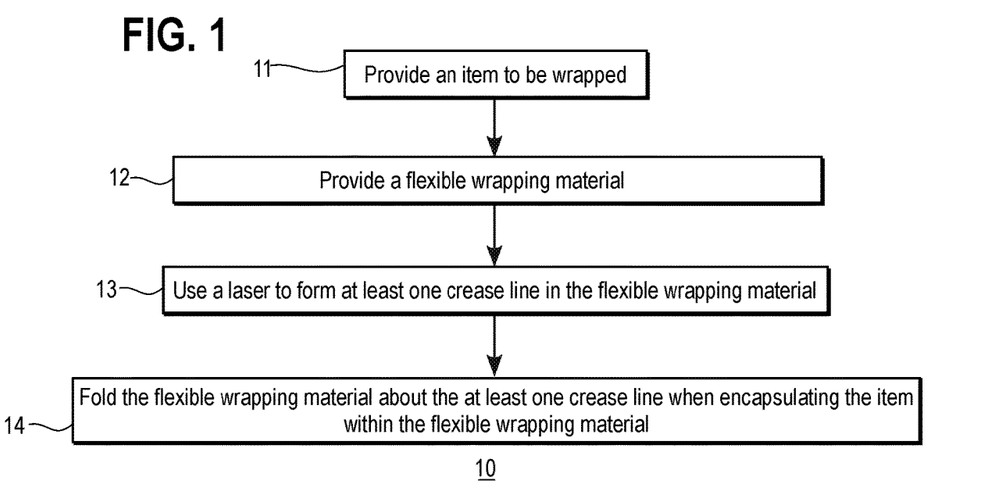
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 10 that is compatible with many of these teachings will now be presented.

Step 11 provides an item to be wrapped. This item can comprise essentially any solid object having any form factor of choice. For the sake of illustration it will be presumed here that this item comprises an edible item such as a confectionary of choice. It will be understood that this example is not intended to suggest any particular limitations in these regards whatsoever. (Also for the sake of simplicity it will be presumed here that this item to be wrapped comprises a single item. Again, however, it will be understood that these teachings are not limited in these regards. Instead, if desired, this step of providing an item can comprise providing a plurality of items to be wrapped together in a common package.)

Figure 2:
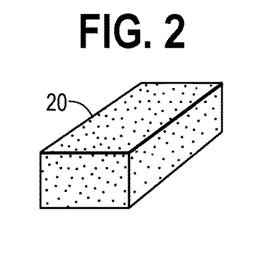
FIG. 2 comprises a perspective view as configured in accordance with various embodiments of the invention.

As noted, this item can have essentially any form factor of choice. For example, and referring now momentarily to FIG. 2, the item can comprise (exactly or approximately) a common rectangular parallelepiped 20. Examples in this regard include many candy bars, cracker sandwiches, and so forth.

Figure 3:
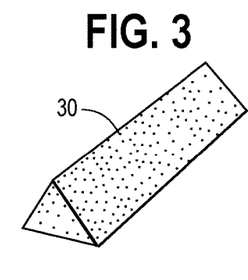
FIG. 3 comprises a perspective view as configured in accordance with various embodiments of the invention.
Figure 4:
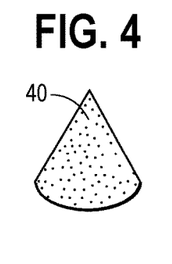
FIG. 4 comprises a perspective view as configured in accordance with various embodiments of the invention.
Figure 5:
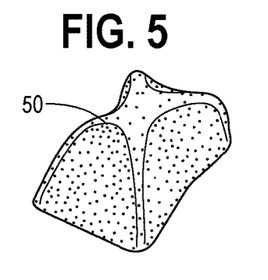
FIG. 5 comprises a perspective view as configured in accordance with various embodiments of the invention.

These teachings will also readily accommodate, however, items having a form factor other than a rectangular parallelepiped. As one example in these regards, and referring now to FIG. 3, the item can comprise a longitudinal member 300 having a triangular lateral cross section. As another example, and as shown in FIG. 4, the item can comprise a conical member 40. And as yet another example, and referring now to FIG. 5, the item 50 can have a more geometrically complicated and/or arbitrary shape. To illustrate by way of example and not by way of limitation, the particular item 50 shown in FIG. 5 has numerous curved and indented surface features.

Whether a material exhibits good dead-fold characteristics, and thus the amount of acceptable spring-back to an original orientation, will vary based upon the particular flexible wrapping material used and application. What may be considered good dead-fold characteristics in one application may be insufficient in other applications. In certain instances, paper and metallic foil may exhibit good dead-fold characteristics. In other instances, flexible packaging materials that may exhibit good dead-fold characteristics include, but are not limited to, waxed paper, waxed glassine, cellulose film (cellulose acetate), polyvinyl chloride ("PVC"), oriented high-density polyethylene ("HDPE"), and polyactic acid or polyactide ("PLA"), all at thicknesses typically used for food packaging flow or twist wraps.

Figure 6:
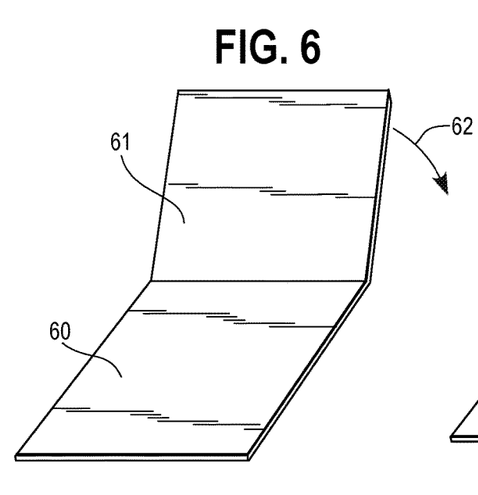
FIG. 6 comprises a perspective view as configured in accordance with various embodiments of the invention.
Figure 7:
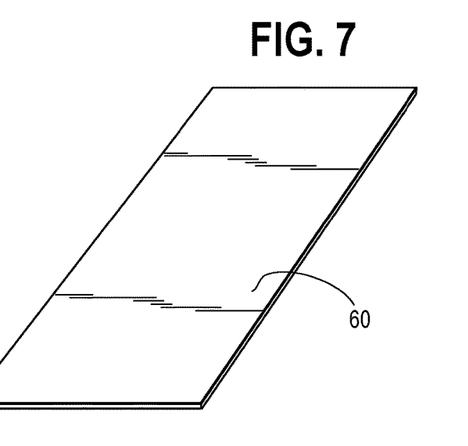
FIG. 7 comprises a perspective view as configured in accordance with various embodiments of the invention.

The percentage of spring back of a material, and thus its dead-fold characteristics, may be measured, for instance, by performing the following test upon a particular material. Referring momentarily to FIG. 7, a given sheet of material 60 lays in a resting position (at) 0°. As shown in FIG. 6, the material 60 has one end 61 that may be bent from its resting position towards its opposite end (a total of) 180° in the direction of the arrow denoted by reference numeral 62. Pressure may be applied at the point of the fold shown in FIG. 6. If the material 60 has good dead-fold characteristics, end 61 remains in its new orientation, or within about 90° of its new orientation, upon removing the external force that bent this end 61. If this material 60 has poor dead-fold characteristics, however, this end 61 will tend to move back through an angle of return towards its original orientation by greater than 90° within 60 seconds of removing the external force. A material with no dead-fold characteristics whatsoever will return completely to its original orientation (i.e., the orientation shown in FIG. 7). A material with poor dead-fold characteristics may not return to the exact original orientation but will move at least halfway to that original orientation in the absence of that external bending force.

Figure 25:
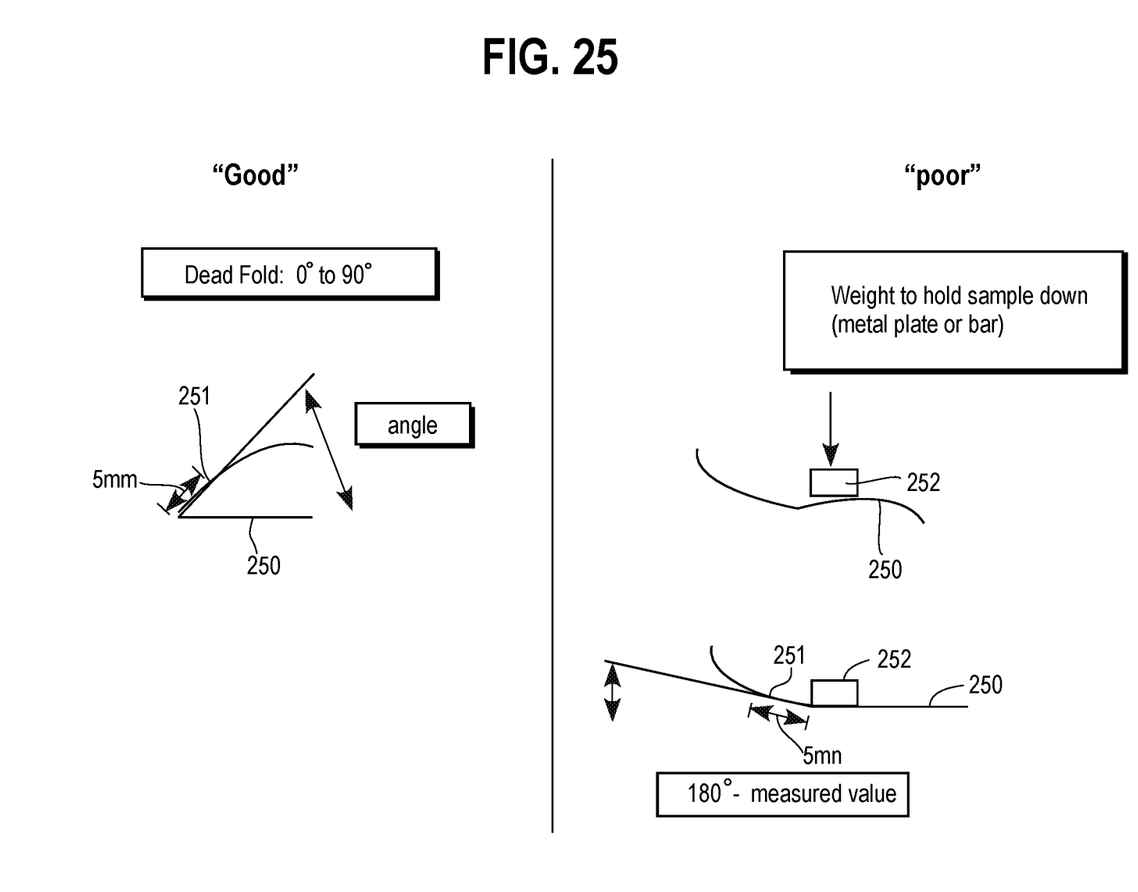
FIG. 25 is a diagram explaining aspects of the testing method.

The above procedure was performed on different materials to further illustrate dead-fold characteristics which will now be described with reference to FIG. 25. Sample sheets 250 of the materials were cut into 10 cm×10 cm squares, and folded in half. In order to fold the sheet in half, it was held at its free ends, the inside surfaces of which were brought together and aligned. The folded area was then placed between seal bars. Pressure of 0.42 N/mm$^2$ (4.2 bar) was applied at the fold (to an area of 1 cm×10 cm) using a Brugger laboratory sealer at seal bar temp 23° C., lab room temp 21° C. for 0.5 seconds dwell time. The pressure was applied using steel bars having a flat steel upper and a flat steel lower. The width of the bars is 1 cm at its lower end. They are applied at a location with one edge immediately adjacent to the fold such that it presses on a strip of the sample 1 cm wide extending away from the folded edge. After 0.5 seconds, the flat seal bars were removed, and the material was placed on a flat surface. After 120 seconds, the angle of return was measured and percent spring-back to original orientation calculated. The angle is measured at a point 251 which is a tangent to the sheet at a point 5 mm (measured along the folded sheet) from the fold. In some cases, if the sheet tends to buckle having been folded and flat as shown in the upper right-hand side of FIG. 25, a weight 252 may be placed onto the sheet immediately adjacent to the fold in order to hold one portion of the sheet flat while the angle of the remaining portion relative to this is measured. In each case, measurements were done of both the machine direction (MD), i.e. the direction in which the sheet of material is formed and in the cross direction (CD) which is transverse to the machine direction. For each measurement, five sheets were tested and the results presented in the table below show the average of these five readings. Table 1 shows the results (including the relative thickness of each material).

TABLE 1

| Dead Fold Rating | Material Structure (outside to inside) | Angle of Return MD Average | Angle of Return CD Average | Return % MD | Return % CD | Thickness |
|---|---|---|---|---|---|---|
| "Good" | 10 μm Alu | 0 | 0 | 0.00 | 0.00 | 10 μm |
| | Alu/Paper/Alu | 5 | 15.5 | 2.78 | 8.61 | 45-50 μm |
| | Printer paper (IGEPA Multifunction paper, print and copy (Art. No. 928A8OS)) | 35.4 | 34.4 | 19.67 | 19.11 | 80 gsm |
| | PVC sheet (Leitz, office material) | 39 | 24.8 | 21.67 | 13.78 | 150 μm |
| | 12 μm PET/Adhesive/7 μm Alu/65 μm PE | 54.6 | 63.6 | 30.33 | 35.33 | 87 μm |
| | 48 μm HDPE/5 μm Tie/ 5 μm Nylon/6 μm Tie/ 11 μm Surlyn (coextruded blown film) | 61 | 84.8 | 33.89 | 47.11 | 76 μm |
| "Poor" | 12 μm PETmet/3 μm Adhesive/ 65 μmPE/20 μm PE peel | 75.6 | 94.2 | 42.00 | 52.33 | 100 μm |
| | 35 μM clear BOPP/ 2.5 μm Ink (printed) | 102 | 96.6 | 56.67 | 53.67 | 35 μm |
| | 20 μm clear BOPP/ 2.2 μm Adh/1.4 μm Ink/ 38 μm met white cavitated BOPP | 110.8 | 128.6 | 61.56 | 71.44 | 65 μm |
| | 20 μm clear BOPP/ 2.2 μm Adh/1.1 μm Ink/ 45 μm BOPP white (two side acrylic coated) | 121.17 | 116.33 | 67.32 | 64.63 | 65 μm |
| | 35 μm clear BOPP (unprinted) | 112.4 | 138 | 62.44 | 72.78 | 35 μm |
| | 65 μm PE/20 μm PE peel (coextruded blown film) | 153 | 152 | 85.00 | 84.44 | 85 μm |

By this test, a material is considered to exhibit poor dead-fold characteristics if it exhibits a percentage spring-back of greater than 50%, more preferably 75% and most preferably 90% for either the MD or CD readings.

For the sake of illustration and again with no intention of suggesting a limitation in these regards, it will be presumed here that this step 12 of providing a flexible wrapping material comprises providing flow-wrapping material. Various flow-wrapping materials are known in the art and can be successfully employed here. By one approach, flow-wrapping materials with poor dead-fold characteristics, such as biaxially-oriented polypropylene ("BOPP") or a blown polyethylene film may be used. Suitable materials also include both single-ply materials as well as multi-ply materials (including laminates other than PET/Al/LDPE). In this case, the flexible wrapping material will typically be drawn from a roll of such a material as needed. As such materials are well known in the art, as is their usual manner of deployment and usage, further elaboration in these regards will not be provided here.

Referring again to FIG. 1, step 13 provides for using a laser to form at least one crease line in the flexible wrapping material. With momentary reference to FIG. 8, this can comprise using a single laser 80 to source a laser beam 81 that forms the crease line in the flexible wrapping material 60. As shown in FIG. 9, this comprises forming a notch 90 in the flexible wrapping material 60 as a result of an ablation effect that evaporates and melts the material depending upon the laser wave length, laser power, and duration of exposure, among other factors. The use of a laser in such an application setting in order to completely sever such flexible wrapping material is well known in the art. The present step 13 can be effected by controlling the power of the laser beam and/or the duration of application to avoid completely cutting through the flexible wrapping material.

Figure 8:
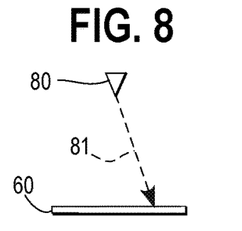
FIG. 8 comprises a side-elevational schematic view as configured in accordance with various embodiments of the invention.
Figure 9:
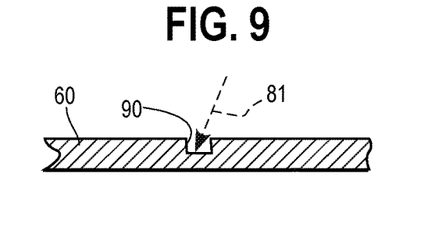
FIG. 9 comprises a sectional side-elevational detail view as configured in accordance with various embodiments of the invention.
Figure 10:
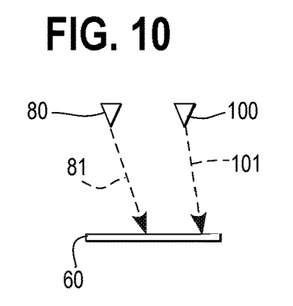
FIG. 10 comprises a side-elevational schematic view as configured in accordance with various embodiments of the invention.

The single laser 80 shown in FIG. 8 can serve to form a plurality of such crease lines if desired. In some application settings, however, and as shown in FIG. 10, it may be desirable to employ one or more additional lasers 100. So configured the two or more resultant laser beams 81 and 101 can be employed to form the one or more desired crease lines in the flexible wrapping material 60. In such a case the two or more lasers (and/or their resultant laser beams) can be essentially identical to one another or can be different if desired. For example, in some cases it may be desired to form some crease lines at a deeper depth than others. The use of two or more lasers may simplify forming crease lines having differing depths.

Figure 11:
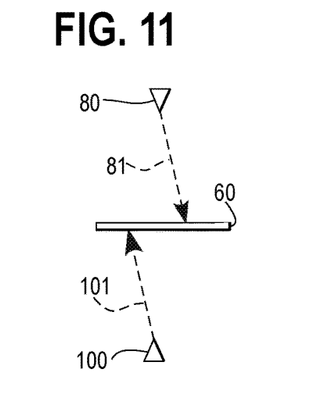
FIG. 11 comprises a side-elevational schematic view as configured in accordance with various embodiments of the invention.

In the two examples just shown the laser beams are impinging only one surface of the flexible wrapping material 60. If desired, however, one or more crease lines can also be formed on the opposing side of the flexible wrapping material 60. By one approach, and as shown in FIG. 11, a first laser 80 can form one or more crease lines on a first side of the flexible wrapping material 60 while a second laser 100 forms one or more crease lines on a second, opposing side of the flexible wrapping material 60.

Figure 12:
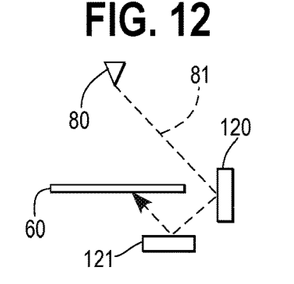
FIG. 12 comprises a side-elevational schematic view as configured in accordance with various embodiments of the invention.
Figure 13:
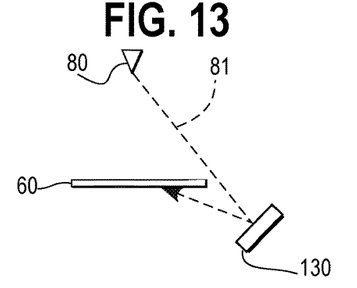
FIG. 13 comprises a side-elevational schematic view as configured in accordance with various embodiments of the invention.

It is also possible, however, to form crease lines on both sides of the flexible wrapping material 60 using but a single laser. Referring for example to FIG. 12, two or more mirrors 120, 121 can serve to reflect the laser beam 81 to the opposing side of the flexible wrapping material 60. By one approach one or more of these mirrors can be selectively manipulated to adjust and control the directionality of the laser beam 81. FIG. 13 depicts an alternative approach that makes use of only a single mirror 130 to achieve a similar functionality. The direction of a laser beam using one or more manipulable mirrors comprises a well-understood area of endeavor that needs no further description here.

Figure 14:
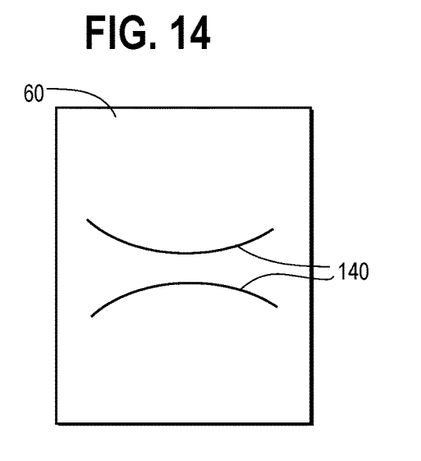
FIG. 14 comprises a top-plan view as configured in accordance with various embodiments of the invention.

These crease lines can have essentially any shape that will result in a desired folding pattern. These teachings will therefore readily accommodate straight crease lines and non-linear crease lines (such as smooth curves, discontinuous lines, and so forth). As one illustrative and non-limiting example in these regards, FIG. 14 depicts a flexible wrapping material 60 having two opposing arcuate lines 140 scribed therein by the aforementioned laser(s). In this example, both lines 140 are on a same side of the flexible wrapping material 60.

Figure 15:
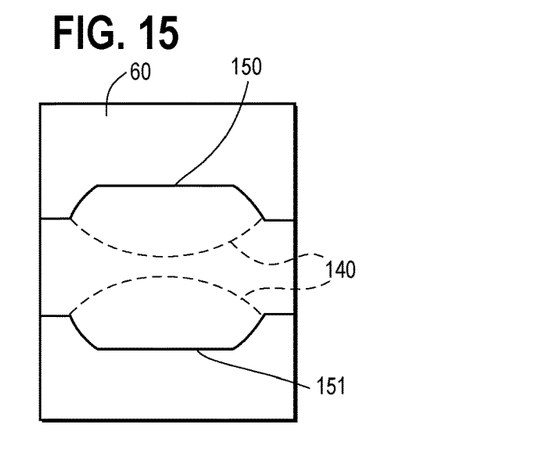
FIG. 15 comprises a top-plan view as configured in accordance with various embodiments of the invention.

If desired, the simple pattern of FIG. 14 can be further embellished with additional crease lines 150/151 as shown in FIG. 15 (in which the lines 140 initially shown in FIG. 14 are presented in phantom lines to simplify identification of the additional crease lines 150/151).

Referring again to FIG. 1, step 14 of this process 10 provides for folding the flexible wrapping material about the one or more crease lines when encapsulating the item within the flexible wrapping material. ("When," as used herein, will be understood to refer to being generally functionally-contemporaneous. Such a state of course occurs in application settings where the folding literally occurs at the same time that the item is being wrapped. A functionally-contemporaneous state also occurs, however, when folding occurs as a part of such encapsulation even when these two activities do not occur wholly or even partially simultaneously. For example, some or all of the requisite folding can occur in preparation to encapsulate the item.)

A more detailed example following the above process is shown in FIGS. 16 and 17A-E. This packaging encapsulates an item 50 which may be an item of confectionery such as a chocolate.

Figure 16:
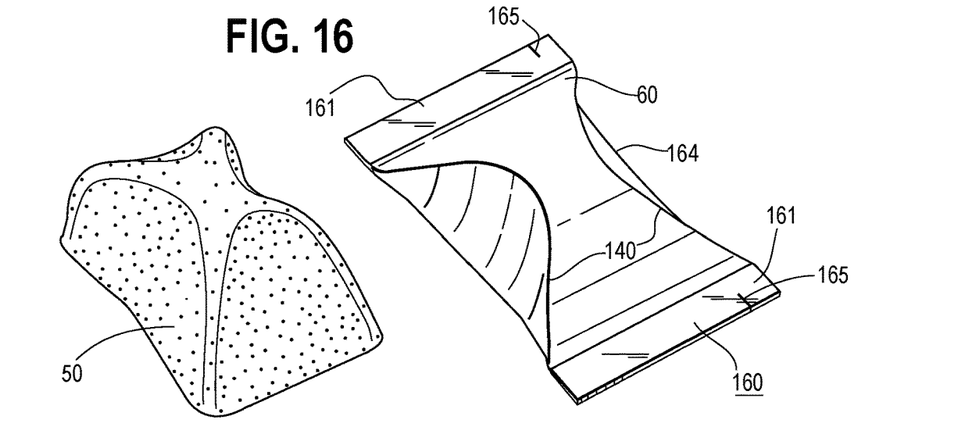
FIG. 16 comprises a perspective view as configured in accordance with various embodiments of the invention.

So configured, it will be noted and appreciated that folding the flexible wrapping material 60 about these crease lines (such as the crease lines denoted by reference numeral 140) forms, at least in part, a form-factor conformal pocket to accommodate the item 50. This pocket need not exactly match every surface feature and perturbation of the item; in this illustrative example, it is sufficient that the crease lines and resultant folded material 50 track and visually suggest the concave side surfaces of the packaged item 50.

In this example, the package 160 comprises a flow-wrapped package and hence has hermetic seals 161 extending laterally across both ends of the package 160 and a longitudinal seal 162 extending along the length of the package. The making of such seals comprises a very well understood area of prior art endeavor and requires no further elaboration here.

Figure 17A:
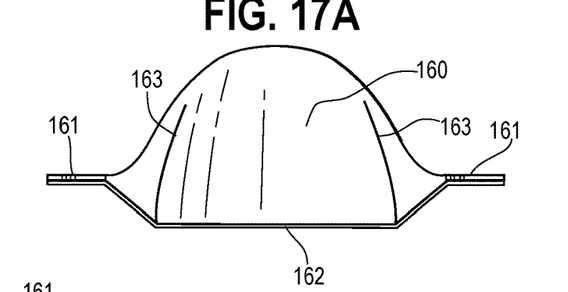
FIGS. 17A-17C are a side view, plan view and underneath plan view respectively of the packaging of FIG. 16.
Figure 17B:
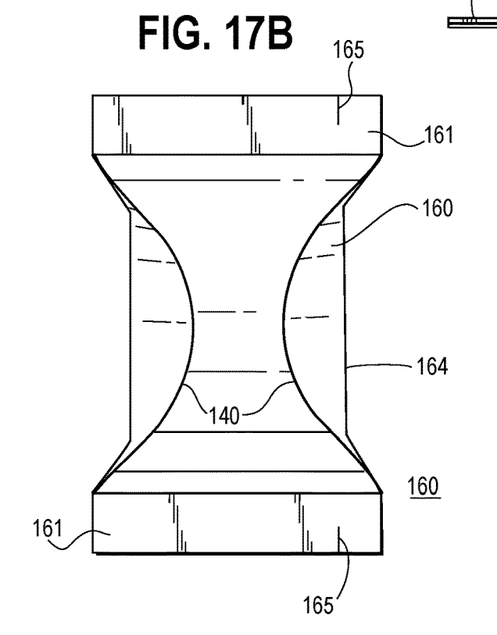
Figure 17C:
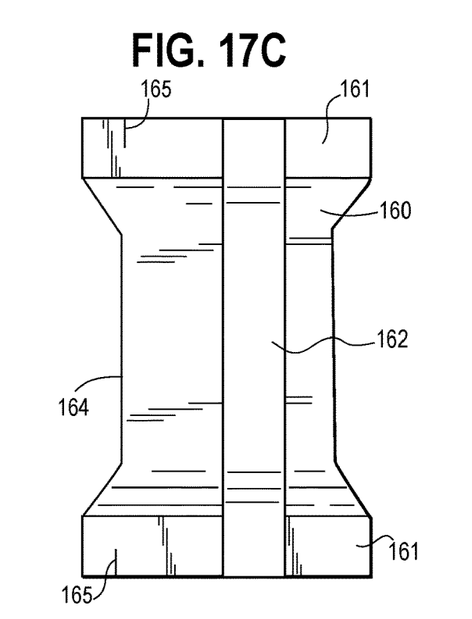
Figure 17D:
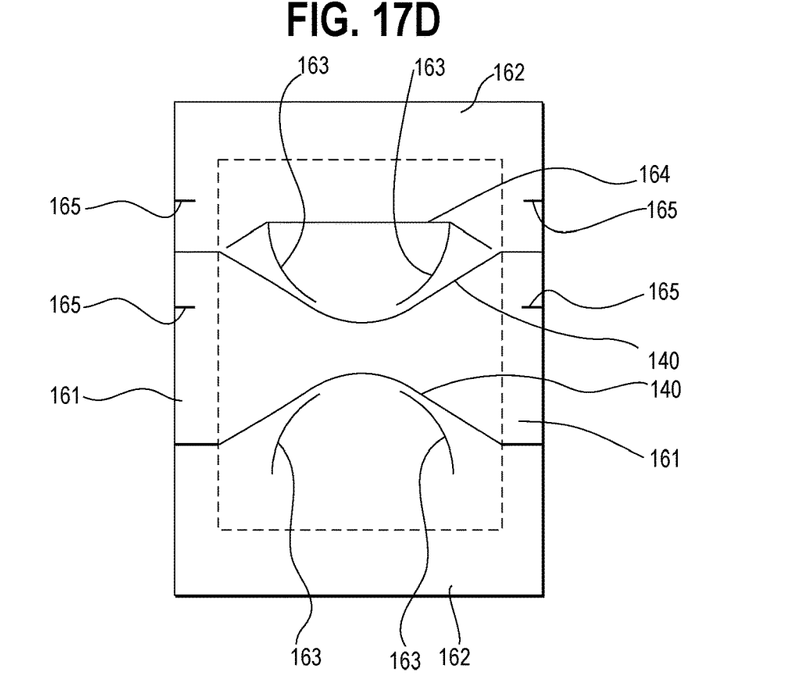
FIG. 17D is a view of the blank from which the packaging of FIGS. 16 and 17A-17C is made.

The blank from which the package 160 is formed is shown in FIG. 17D. The parts which form the hermetic seals 161 are designated by the dashed lines on the blank and the parts which form the longitudinal seal 162 are similarly shown by dashed lines. Laser score crease lines 140 are shown running across the full width of the packaging and having a curved portion at their central regions so that the crease lines are at their closest at the central region of the packaging. Auxiliary laser cut crease lines 163 are created beneath the crease lines 140 in order to facilitate the folding operation.

As is apparent from FIG. 17D, a further score line 164 is created in the packaging using the same laser scribing technique as used to create the crease lines 140 and 163. This score line 164 extends along the part of the package which, in use, will be the transition between the base and side walls. Although this plays some role in the folding operation, it is primarily its primary purpose as a line of weakness to open the packaging as described below.

Both of the seals 161 are shown having a nick 165 in the form of a through cut which may be formed by the laser used to cut the crease and score lines, or which may be formed in some other way such as a die cut technique. The nick 165 provides a tear initiation site. It will be appreciated that only one nick may be present in the finished package.

In order to open the packaging, the user grasps a seal 161 and tears the seal 161 along the line of the nick 165. The tear then propagates through the sealed part of the packaging and into the main compartment, whereupon it extends along the upper and lower surfaces until it reaches the crease line 140 and the score line 164, whereupon it generally tends to follow these lines so that the package will tear open along these two lines. In order to facilitate the tear propagation in the appropriate direction, the material may be an oriented film generally oriented in the direction of tear propagation. The exact path of the tear will depend upon the degree of force applied to the packaging, such that it will not, in all cases, follow the lines 140 and 164 their entire lengths. Indeed, depending upon the force required, it may deviate quite substantially from these lines. However, in general, the packaging tears open along this region allowing the item to be removed from the side of the packaging.

Figure 17E:
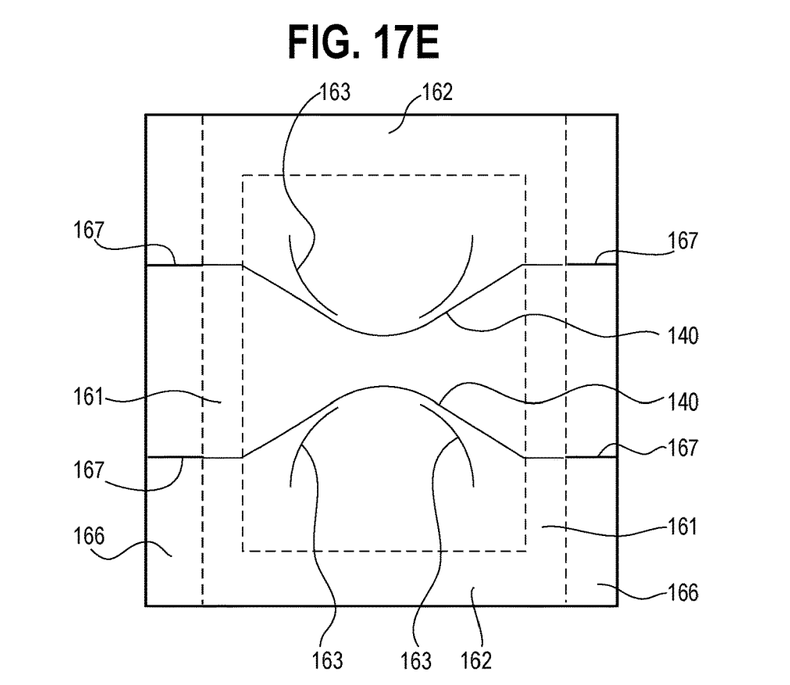
FIG. 17E is a view of a blank having a similar form to that of FIG. 17D, but having a different opening mechanism.

Packaging having a similar overall shape but a different opening mechanism is shown in FIG. 17E. Here, the aspects that this design has in common with the previously described example have been labeled with the same reference numerals and only the difference will be described. It will be noted that the hermetic seal 161 does not extend all the way to the outer edge of the packaging such that there is a free region 166 on each side outward of the seal 161. In each free region are a pair of through cuts 167 which extend the full width of the free region and terminate at the seal 161. The package illustrated in FIG. 17E may be opened from either end. However, it is equally possible that the free region 166 and through cuts 167 are only provided on one end of the packaging if it is only desirable to open it from a single end. When the blank is folded into the complete packaging, the free end 166 comprises two layers which are not bonded to one another. The user separates these two layers and pulls them apart. As the cut lines 167 lead directly into the crease lines 140, the tearing now occurs generally along both of the crease lines 140 so that the entire top of the packaging between these lines is effectively torn back along these two lines. It will be noted, in this example, that there is no score line 164 as the packaging is opening along the top, rather than along the side.

Figure 18:
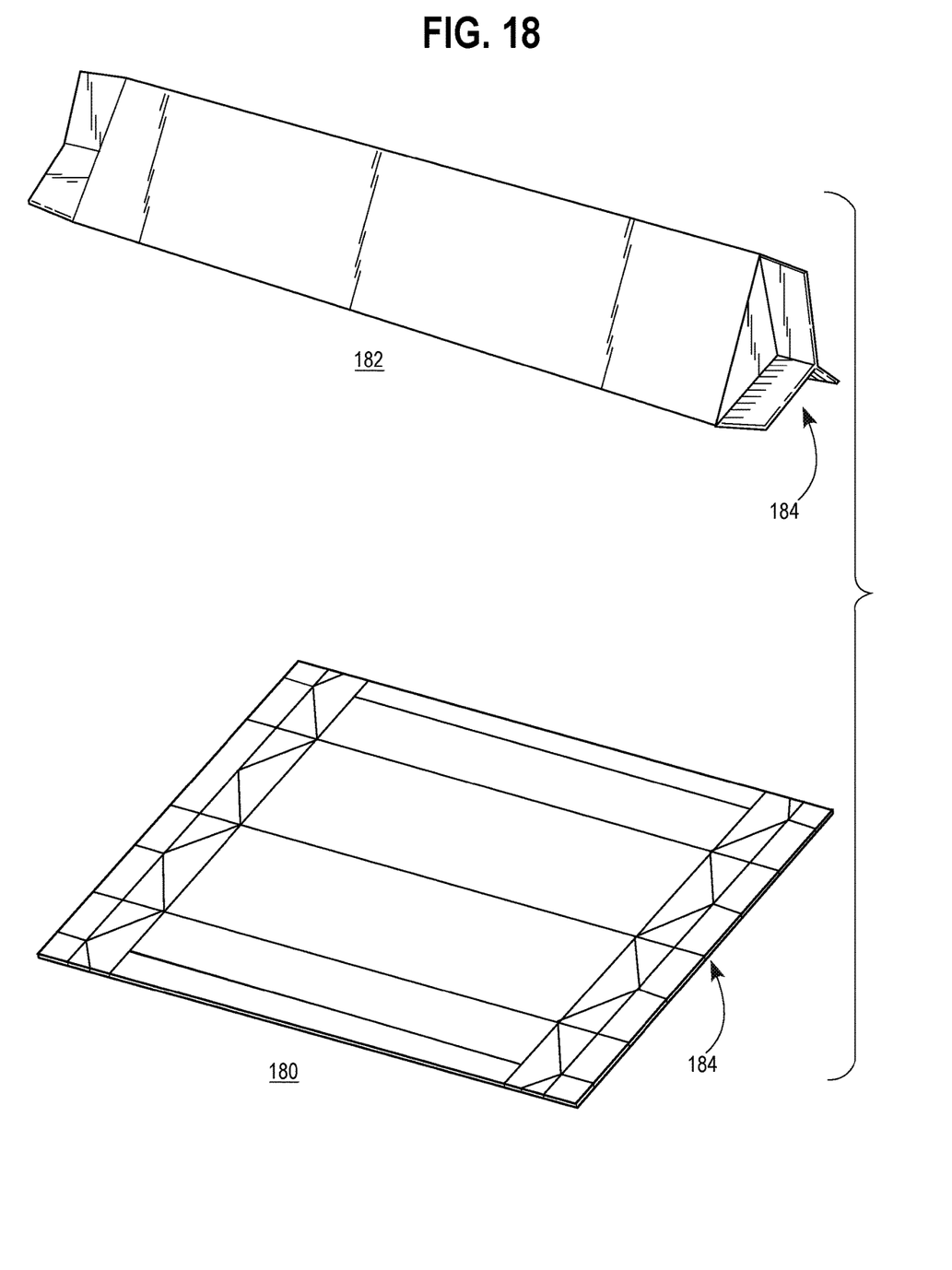
FIG. 18 comprises top-plan detail and perspective views as configured in accordance with various embodiments of the invention.

As another example in these regards, and in particular to illustrate how adaptable these teachings are with respect to generally conforming to a wide variety of uniquely-shaped items, FIG. 18 presents a crease-line pattern 180. By laser forming such a pattern in a suitable material that exhibits poor dead-fold characteristics one can then easily form (by forming creases in the material in accordance with the illustrated pattern) a corresponding package 182 that essentially replicates the very-familiar package for the well-known Toblerone chocolate bar. (To achieve this result, a suitable adhesive can be disposed on the displayed surface around the entire periphery thereof to hold the material in its folded state.) Notably, the crease-line pattern 180 results in one particular type of end fold 184.

Figure 19:
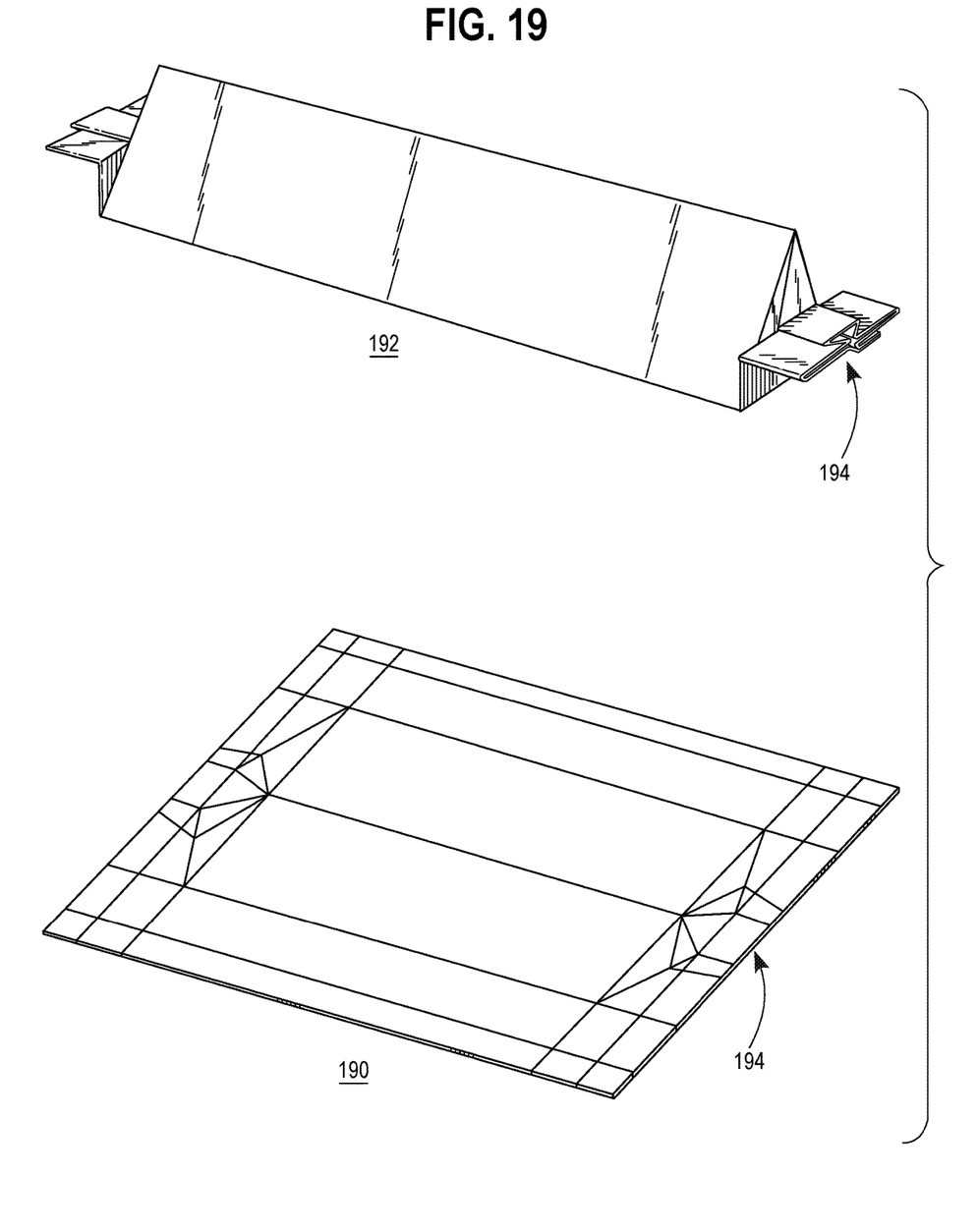
FIG. 19 comprises a top-plan detail and perspective views as configured in accordance with various embodiments of the invention.

FIG. 19 presents a similar crease-line pattern 190. Folding laser-formed pattern 190 results in the finished package 192 that again replicates the familiar Toblerone packaging, but features an alternative end fold 194.

Figure 20:
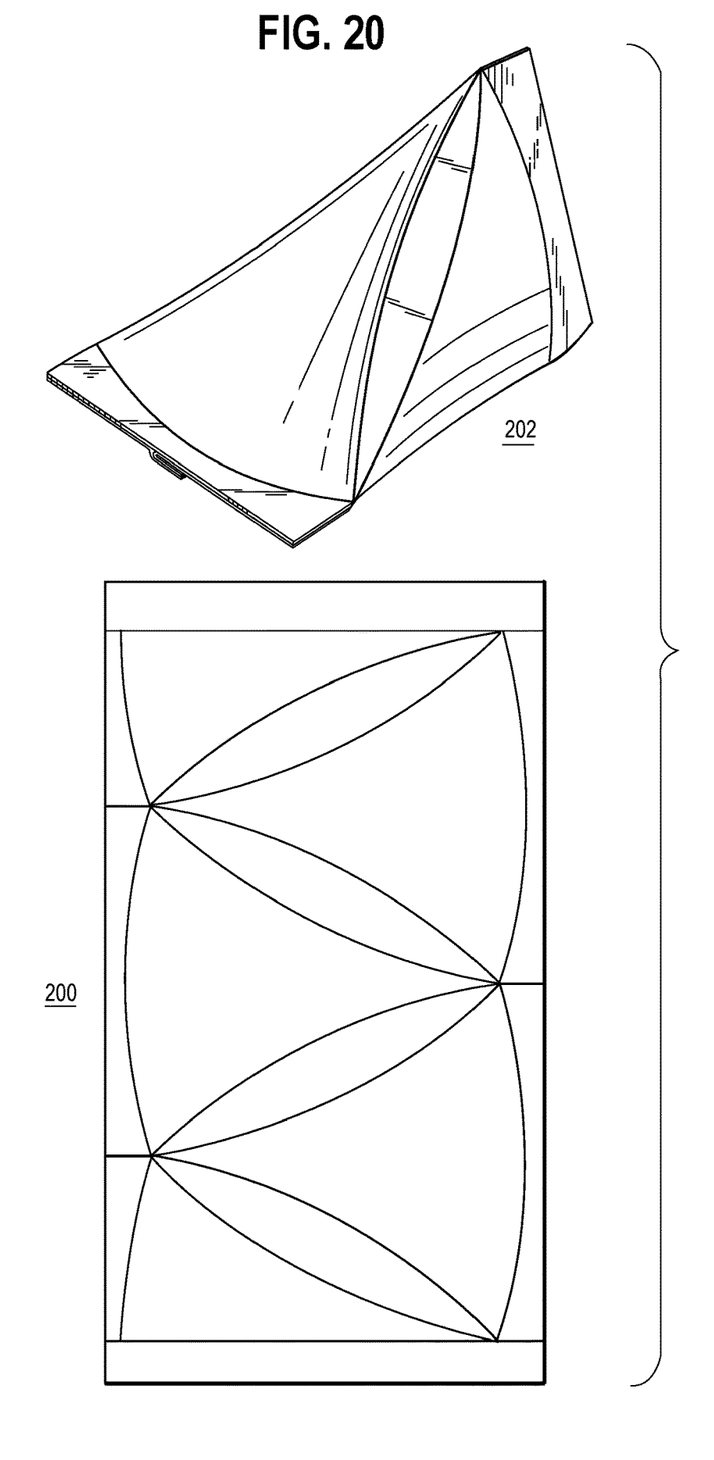
FIG. 20 comprises top-plan detail and perspective views as configured in accordance with various embodiments of the invention.

FIG. 20 presents a crease-line pattern 200. Folding of the laser-formed pattern results in the finished tetrahedral package 202.

Figure 21:
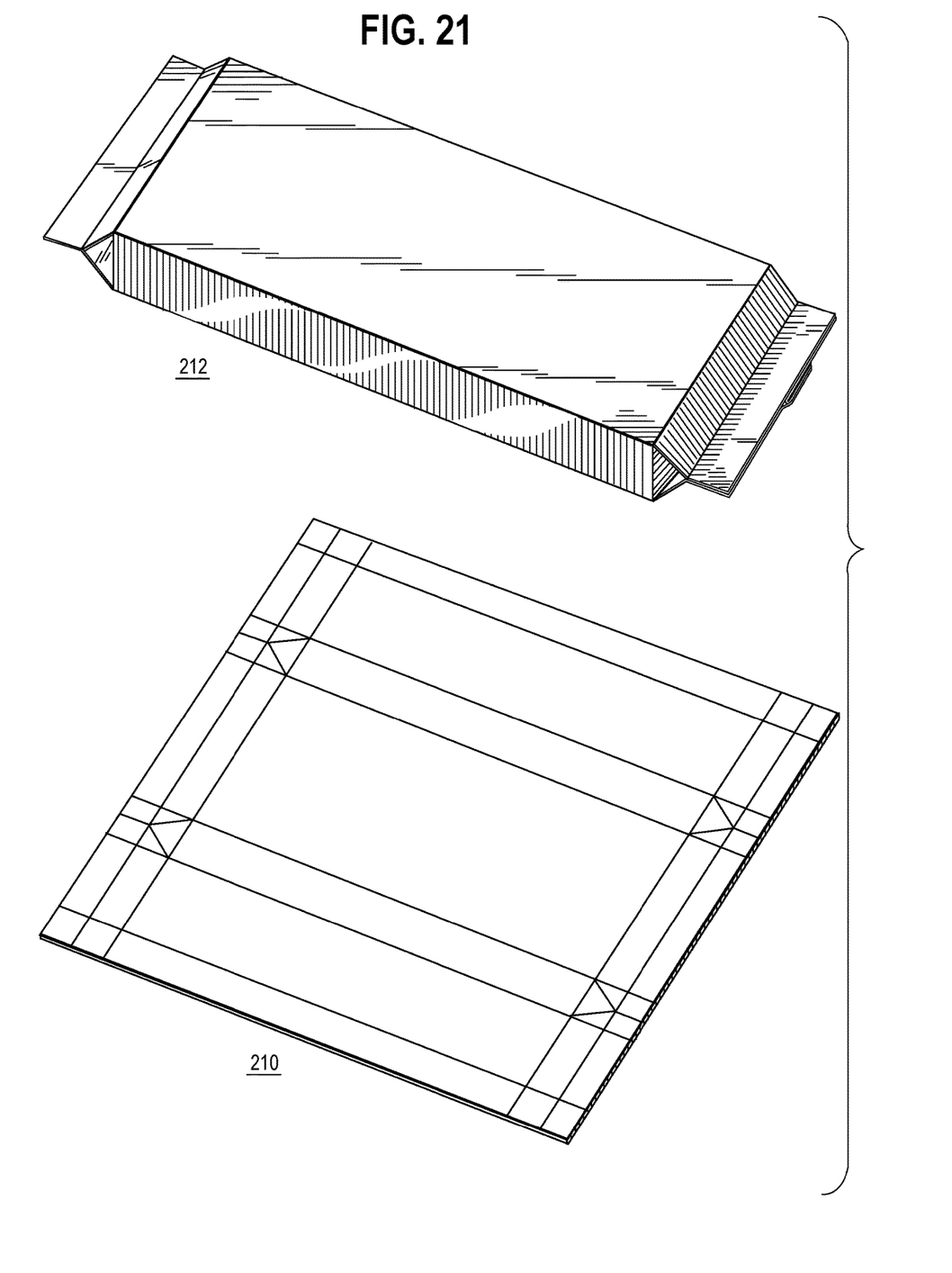
FIG. 21 comprises top-plan detail and perspective views as configured in accordance with various embodiments of the invention.

Similarly, FIG. 21 presents another crease-line pattern 210. Folding of the laser-formed pattern results in the rectangular-shaped tablet style finished package 212.

Figure 22:
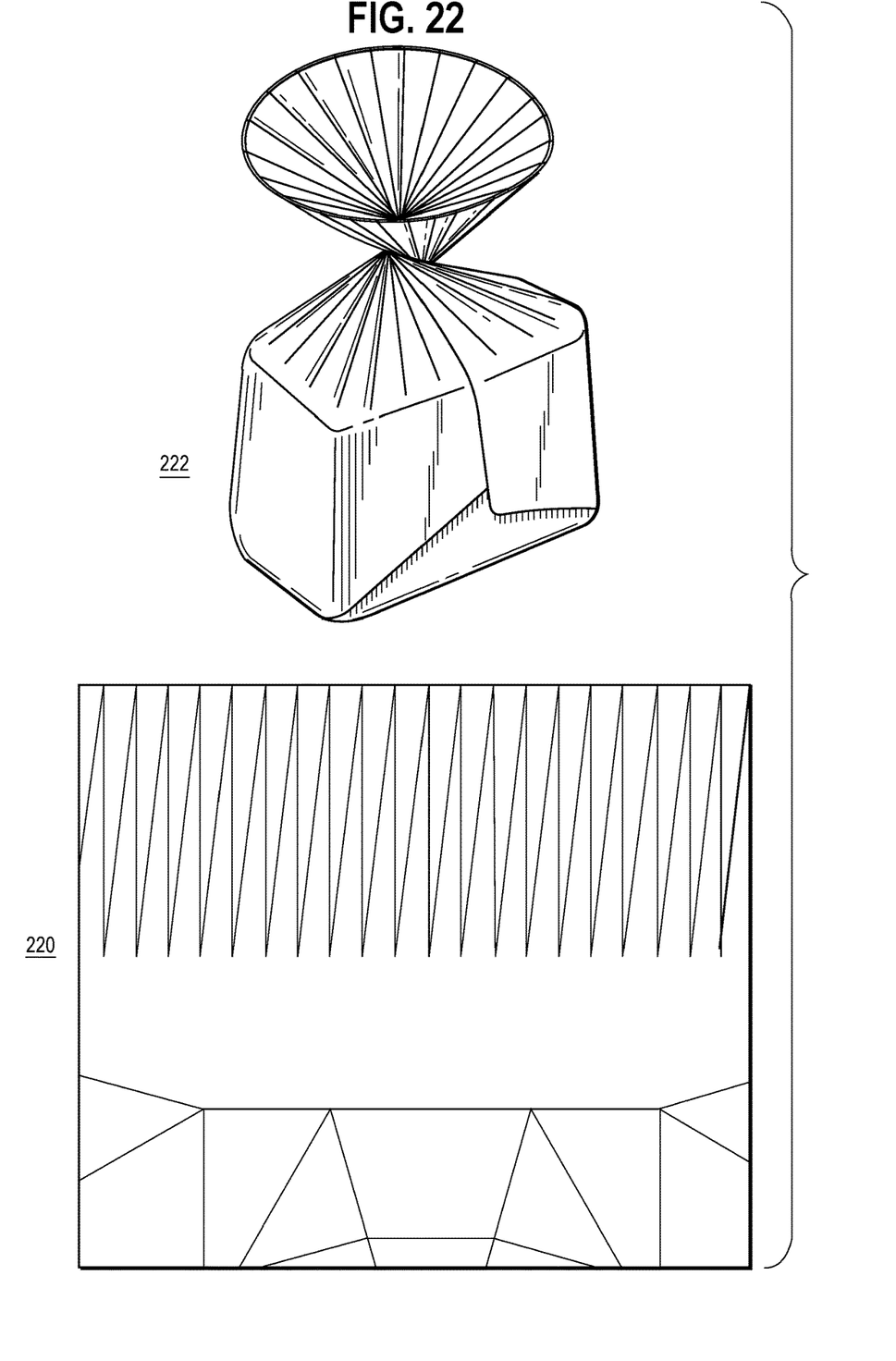
FIG. 22 comprises top-plan detail and perspective views as configured in accordance with various embodiments of the invention.

FIG. 22 presents a crease-line pattern 220 which, when folded, results in the twist-wrap style finished package 222.

These illustrations demonstrate that there may be great variety with respect to the number, orientation, placement, and interaction of laser-formed crease lines available to create an assortment of three-dimensional packages having non-traditional shapes, form factors, and so forth. For the sake of simplicity and clarity, the crease lines in these illustrations do not attempt to indicate the directionality of the fold. It will also be recognized by one skilled in the art that, in many instances, the material may be folded in an inward or outward direction without regard to the side of the material upon which the crease was made, without affecting the resultant package.

Figure 23:
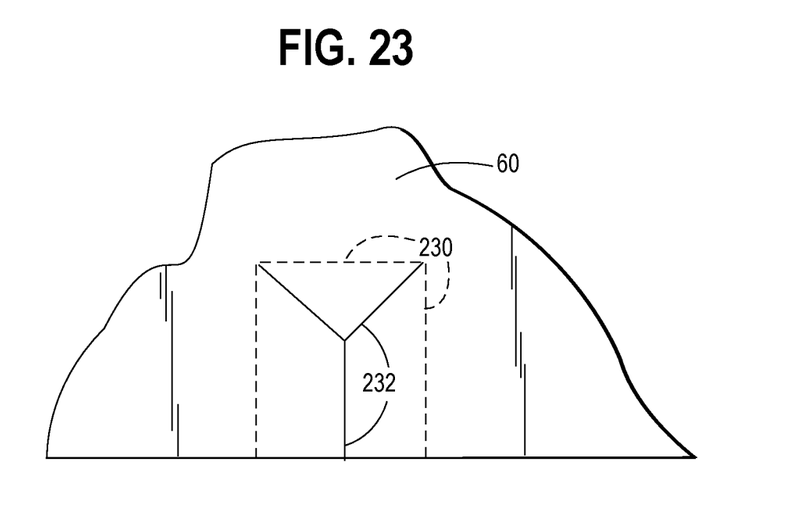
FIG. 23 comprises a top-plan detail view as configured in accordance with various embodiments of the invention.
Figure 24:
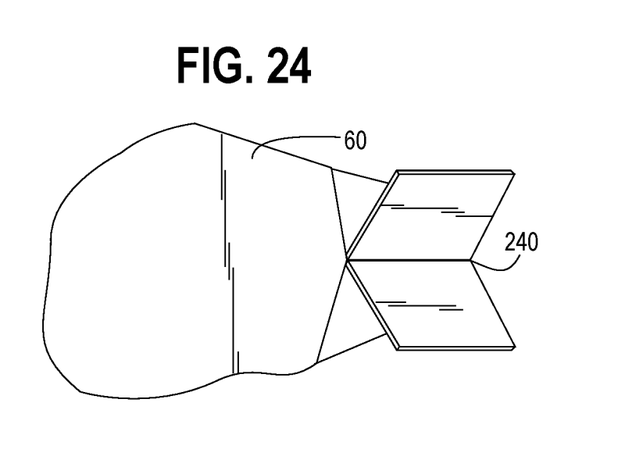
FIG. 24 comprises a side-elevational detail view as configured in accordance with various embodiments of the invention.

As alluded to earlier, these teachings can also be employed to facilitate the forming of gussets in such flexible wrapping material. As used herein, a "gusset" will be understood to comprise a pocket formed by disposing a portion of the packaging material inwardly of the package itself. To illustrate by way of a non-limiting example, and referring now to FIG. 23, a plurality of crease lines have been formed in a sheet of flexible wrapping material 60 using the laser-based techniques described herein. In this example, to more clearly illustrate the creation of the gusset, the crease lines 230 denoted with phantom lines represent crease lines where the material 60 folds to the inside of the resultant package while the crease lines 232 denoted as solid lines are crease lines where the material 60 folds to the outside of the resultant package. As shown in FIG. 24, the resulting gusset 240 features sharply-creased folds that are precisely located. This, in turn, can contribute significantly to the aesthetic appeal of the final package and can also help to ensure an adequate seal when the seal is formed in an area of the package that includes the gusset.

These teachings permit relatively inexpensive and well-understood packaging materials such as flow-wrapping materials to be used while also achieving a resultant package having one or more well-defined surface lines. This provides a final package that can, for example, generally conform to the shape of an item (or items) contained within the package. The resultant appearance tends to be aesthetically pleasing and to connote an air of sophistication and expense notwithstanding the modest cost of achieving this appearance. These teachings therefore provide a highly cost-effective approach to achieving a distinctive and unique package that belies these cost efficiencies.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. An apparatus comprising:
 a wrapper configured to be disposed about a solid item, wherein the wrapper comprises a flexible wrapping material that exhibits poor dead-fold characteristics in that it exhibits a percentage spring-back of greater than 50%; and
 a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, and wherein the laser-formed crease lines include two opposing arcuate laser-formed crease lines formed on a same side of the flexible wrapping material, each of the arcuate crease lines having opposing ends that are each connected to an end of a corresponding straight laser-formed crease line that extends at a right angle and all the way to an edge of the flexible wrapping material.

2. The apparatus of claim 1 wherein the opposing ends of each of the arcuate crease lines also connect to an end of a corresponding laser-formed crease line that extends away from the corresponding arcuate crease line such that the crease lines and folded material forms the form-factor conformal pocket to accommodate the item and visually suggest concave side surfaces of the item.

3. The apparatus of claim 1 wherein the flexible wrapping material exhibits poor dead-fold characteristics in that it exhibits a percentage spring-back of greater than 75%.

4. An apparatus comprising:
a wrapper configured to be disposed about an item, wherein the wrapper comprises a flexible wrapping material that exhibits poor dead-fold characteristics in that it exhibits a percentage spring-back of greater than 50%; and
a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, and wherein the laser-formed crease lines include two opposing crease lines formed on a same side of the flexible wrapping material each having a curved portion at their central regions such that the two opposing crease lines are at their closest at a central region of the wrapper, each of the said opposing crease lines having straight portions which extend at a right angle and all the way to an edge of the flexible wrapping material on either side of the curved portion, and further wherein the laser formed crease lines include additional arcuate crease lines that are created beneath the opposing crease lines to facilitate folding the wrapper about the item.

5. The apparatus of claim 4 wherein the flexible wrapping material exhibits poor dead-fold characteristics in that it exhibits a percentage spring-back of greater than 75%.

6. An apparatus comprising:
a wrapper configured to be disposed about an item, wherein the wrapper comprises a flexible wrapping material that exhibits poor dead-fold characteristics in that it exhibits a percentage spring-back of greater than 50%; and
a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, wherein the laser-formed crease lines include a plurality of arcuate crease lines such the resultant wrapper forms a package having a tetrahedral shape.

7. The apparatus of claim 6 wherein the flexible wrapping material exhibits poor dead-fold characteristics in that it exhibits a percentage spring-back of greater than 75%.

8. An apparatus comprising:
a wrapper configured to be disposed about a solid item, wherein the wrapper comprises a flexible wrapping material that exhibits poor dead-fold characteristics in that it exhibits a percentage spring-back of greater than 50%; and
a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, and wherein the laser-formed crease lines include two opposing arcuate laser-formed crease lines formed on a same side of the flexible wrapping material, each of the arcuate crease lines having opposing ends that are each connected to an end of a corresponding straight laser-formed crease line that extends at a right angle and all the way to an edge of the flexible wrapping material.

9. The apparatus of claim 8 wherein the opposing ends of each of the arcuate crease lines also connect to an end of a corresponding laser-formed crease line that extends away from the corresponding arcuate crease line such that the crease lines and folded material forms the form-factor conformal pocket to accommodate the item and visually suggest concave side surfaces of the item.

10. An apparatus comprising:
a wrapper configured to be disposed about an item, wherein the wrapper comprises a flexible wrapping material that exhibits poor dead-fold characteristics in that it exhibits percentage spring-back of greater than 50%; and
a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, and wherein the laser-formed crease lines include two opposing crease lines formed on a same side of the flexible wrapping material each having a curved portion at their central regions such that the two opposing crease lines are at their closest at a central region of the wrapper, each of the said opposing crease lines having straight portions which extend at a right angle and all the way to an edge of the flexible wrapping material on either side of the curved portion, and further wherein the laser formed crease lines include additional arcuate crease lines that are created beneath the opposing crease lines to facilitate folding the wrapper about the item.

11. An apparatus comprising:
a wrapper configured to be disposed about an item, wherein the wrapper comprises a flexible wrapping material that exhibits poor dead-fold characteristics in that it exhibits a percentage spring-back of greater than 50%; and
a plurality of laser-formed crease lines in the flexible wrapping material, the laser formed crease lines being configured such that when the flexible wrapping material is folded about the crease lines when the item is wrapped in the wrapper a form-factor conformal pocket is, at least in part, formed to accommodate the item, wherein the laser-formed crease lines include a plurality of arcuate crease lines such the resultant wrapper forms a package having a tetrahedral shape.

* * * * *